US012545475B2

(12) United States Patent
Williamson

(10) Patent No.: US 12,545,475 B2
(45) Date of Patent: Feb. 10, 2026

(54) TOOL FOR RESISTING ROTATION FORCES ON A CONTAINER DURING MIXING OPERATION

(71) Applicant: Robert Winfield Williamson, Lexington, NC (US)

(72) Inventor: Robert Winfield Williamson, Lexington, NC (US)

(*) Notice: Subject to any disclaimer, the term of this patent is extended or adjusted under 35 U.S.C. 154(b) by 0 days.

(21) Appl. No.: 18/731,744

(22) Filed: Jun. 3, 2024

(65) Prior Publication Data

US 2024/0400263 A1 Dec. 5, 2024

Related U.S. Application Data

(60) Provisional application No. 63/470,218, filed on Jun. 1, 2023.

(51) Int. Cl.
*B01F 35/40* (2022.01)
*B65D 25/20* (2006.01)

(52) U.S. Cl.
CPC .............. *B65D 25/20* (2013.01); *B01F 35/40* (2022.01)

(58) Field of Classification Search
CPC .......... B01F 35/42; B01F 35/43; B01F 35/40; B65D 25/20
See application file for complete search history.

(56) References Cited

U.S. PATENT DOCUMENTS

| | | | | |
|---|---|---|---|---|
| 6,829,800 B2 * | 12/2004 | Roebuck | B67B 7/14 | 7/161 |
| 6,942,191 B2 * | 9/2005 | Zagorsky | B01F 35/42 | 248/146 |
| 7,494,097 B2 * | 2/2009 | Lidie | B01F 35/42 | 248/154 |
| 7,494,103 B1 * | 2/2009 | Huebner | B28C 5/10 | 248/346.06 |
| 7,651,060 B2 * | 1/2010 | Roth | B01F 35/42 | 248/500 |
| 9,573,728 B2 * | 2/2017 | Jacobson | B01F 35/40 | |
| 10,112,163 B2 * | 10/2018 | Beardsley | B01F 35/43 | |
| 10,189,298 B2 * | 1/2019 | Kahra | B65G 65/23 | |
| 2003/0016586 A1 * | 1/2003 | Williams | B01F 33/5011 | 366/349 |
| 2016/0257546 A1 * | 9/2016 | Piccirilli | B67B 7/44 | |

* cited by examiner

*Primary Examiner* — Bradley Duckworth
(74) *Attorney, Agent, or Firm* — NK Patent Law

(57) ABSTRACT

A tool for resisting rotation of a bucket of the type having a handle carried on a support wire is provided. The tool includes a handle engaging portion configured for attaching or engaging with the handle of the bucket, and a step plate coupled with the handle engaging portion and configured for resting against a surface of the ground. The handle engaging portion and the step engaging portion are configured to extend at generally right angles from each other. In operation, the handle engaging portion is engaged with the handle of the bucket, and the step plate is positioned on the ground, and a user steps on the step plate during mixing of materials contained within the bucket.

12 Claims, 4 Drawing Sheets

TOOL FOR RESISTING ROTATION FORCES ON A CONTAINER DURING MIXING OPERATION

CROSS-REFERENCE TO RELATED APPLICATIONS

This application claims priority to U.S. Provisional Patent Application No. 63/470,218 entitled "TOOL FOR RESISTING ROTATION FORCES ON A CONTAINER DURIN MIXING OPERATION" that was filed on Jun. 1, 2023, and incorporated by reference herein.

TECHNICAL FIELD

The presently disclosed subject matter is directed towards a tool for resisting rotation forces on a container during a mixing operation. More particularly, it is directed towards a tool for resisting rotation forces of a bucket during a mixing operation.

BACKGROUND

Many chemicals or other materials are provided in a mixing container in a multitude of industries. For example, the construction industry uses large containers such as a five gallon bucket to contain paint, joint compound for sheetrock installation and repair, and other chemicals. The chemicals will often liquid separate from the factory or begin to dry out around the periphery and it is desirable to mix the chemicals before use. This is routinely accomplished with a power drill and a mixing tool such as a mixing paddle.

The mixing tool often has a large surface or working area in order to more quickly and thoroughly mix the chemicals. And the power drill is often of significant power and torque. Due to this combination, the bucket will oftentimes begin to spin while mixing, especially so with thick materials such as joint compound. This is disadvantageous for many reasons. One is that spinning of the bucket offsets the rotation of the mixing tool and the mixing operation is not effective. This situation can also lead to chemical spills and the like, ruining not only the product that is being mixed but also the surrounding structures such as floor and/or ceiling. Most importantly, the spinning bucket is a significant safety concern. Most buckets include a handle held on a metal wire that will begin to flare outwardly during rotation due to centrifugal forces; this presents a dangerous situation. Additionally, a bucket of sheetrock compound or paint weighs upwards of sixty pounds, and spinning of that weight can present a dangerous situation.

Methods to resist rotation of the bucket during mixing have been proposed. For example, the user may position the bucket between their two legs and pinch the bucket between their legs. This presents a dangerous situation. Another method may involve placing the bucket into a recessed holder that sits on the floor and the user steps on a flange attached to the holder. This is disadvantageous though because it requires the user to lift the bucket and then position the bucket back into the holder. Another method involves making a prefabricated bucket with an aperture extending therethrough that is configured for receiving a user's foot. This is disadvantageous though because it requires moving the construction or other chemicals into the special purpose bucket, and it may also lead to the user's ankle being twisted during rotation, risking injury. Additionally, the bucket may be single use, despite the increased costed associated therewith.

Accordingly, an apparatus or tool to resist rotation of a mixing container is needed.

SUMMARY

This summary is provided to introduce in a simplified form concepts that are further described in the following detailed descriptions. This summary is not intended to identify key features or essential features of the claimed subject matter, nor is it to be construed as limiting the scope of the claimed subject matter.

Disclosed herein is a tool for resisting rotation of a bucket of the type having a handle carried on a support wire is provided. The tool includes a handle engaging portion configured for attaching or engaging with the handle of the bucket, and a step plate coupled with the handle engaging portion and configured for resting against a surface of the ground. The handle engaging portion and the step engaging portion are configured to extend at generally right angles from each other. In operation, the handle engaging portion is engaged with the handle of the bucket, and the step plate is positioned on the ground, and a user steps on the step plate during mixing of materials contained within the bucket.

According to one or more embodiments, the handle engaging portion defines at least one arcuate recess formed on outwardly extending flanges that is configured for receiving an arcuate exterior surface of the handle of the bucket.

According to one or more embodiments, the handle engaging portion defines multiple arcuate recesses that are spaced-apart to accommodate varying heights of the handle of the bucket.

According to one or more embodiments, the handle engaging portion is hingedly connected to the step plate.

According to one or more embodiments, the tool defines a mode of operation in which the handle engaging portion and the step plate are rotated towards each other to create a collapsed assembly, wherein, the tool is useful in the collapsed assembly for storage and/or for prying open a lid of the bucket.

According to one or more embodiments, the handle engaging portion defines a flange on a distal end thereof, the flange configured for assisting in prying open a lid of the bucket.

According to one or more embodiments, the tool includes a support tube on the handle engaging portion for creating a fulcrum for assisting in prying open the lid of the bucket.

According to one or more embodiments, the handle engaging portion defines apertures for being received on a hook or other protrusion for use with a peg board or similar.

According to one or more embodiments, the step plate includes a plurality of recessed slots for providing a gripping surface for the user's foot.

BRIEF DESCRIPTION OF THE DRAWINGS

The foregoing, as well as the following Detailed Description of preferred embodiments, is better understood when read in conjunction with the appended drawings. For the purposes of illustration, there is shown in the drawings exemplary embodiments; however, the presently disclosed subject matter is not limited to the specific methods and instrumentalities disclosed.

The embodiments illustrated, described, and discussed herein are illustrative of the present invention. As these embodiments of the present invention are described with reference to illustrations, various modifications or adaptations of the methods and or specific structures described may become apparent to those skilled in the art. It will be appreciated that modifications and variations are covered by the above teachings and within the scope of the appended claims without departing from the spirit and intended scope thereof. All such modifications, adaptations, or variations that rely upon the teachings of the present invention, and through which these teachings have advanced the art, are considered to be within the spirit and scope of the present invention. Hence, these descriptions and drawings should not be considered in a limiting sense, as it is understood that the present invention is in no way limited to only the embodiments illustrated.

DETAILED DESCRIPTION

Figure 1:
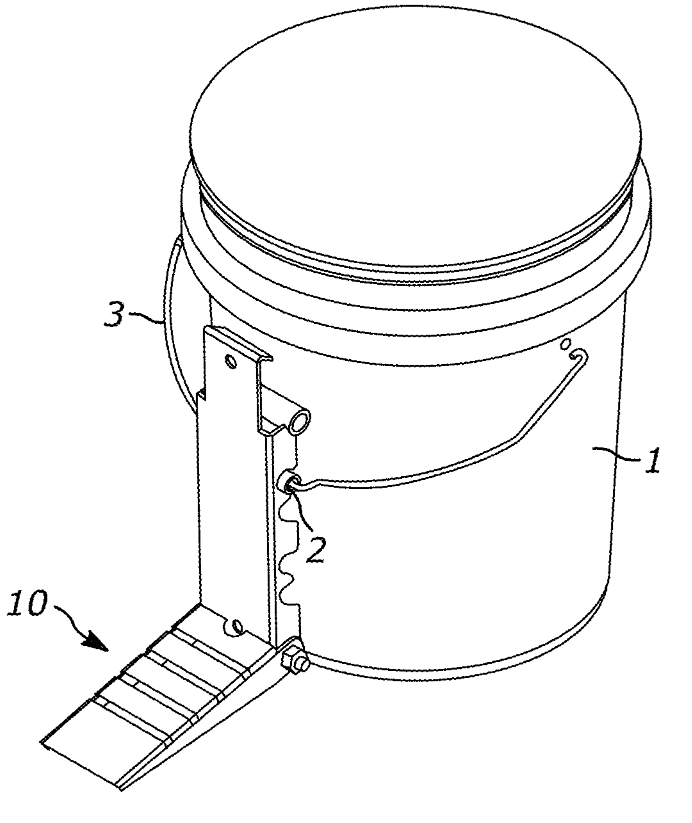
FIG. 1 is a perspective view of a bucket with a tool installed thereon according to one or more embodiments disclosed herein.
Figure 2:
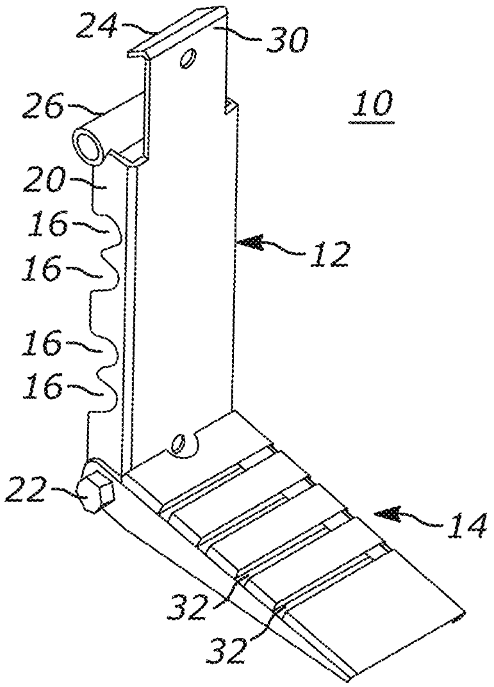
FIG. 2 is a perspective view of the tool shown in FIG. 1 according to one or more embodiments disclosed herein.

These descriptions are presented with sufficient details to provide an understanding of one or more particular embodiments of broader inventive subject matters. These descriptions expound upon and exemplify particular features of those particular embodiments without limiting the inventive subject matters to the explicitly described embodiments and features. Considerations in view of these descriptions will likely give rise to additional and similar embodiments and features without departing from the scope of the inventive subject matters. Although the term "step" may be expressly used or implied relating to features of processes or methods, no implication is made of any particular order or sequence among such expressed or implied steps unless an order or sequence is explicitly stated.

Any dimensions expressed or implied in the drawings and these descriptions are provided for exemplary purposes. Thus, not all embodiments within the scope of the drawings and these descriptions are made according to such exemplary dimensions. The drawings are not made necessarily to scale. Thus, not all embodiments within the scope of the drawings and these descriptions are made according to the apparent scale of the drawings with regard to relative dimensions in the drawings. However, for each drawing, at least one embodiment is made according to the apparent relative scale of the drawing.

Unless defined otherwise, all technical and scientific terms used herein have the same meaning as commonly understood to one of ordinary skill in the art to which the presently disclosed subject matter pertains. Although any methods, devices, and materials similar or equivalent to those described herein can be used in the practice or testing of the presently disclosed subject matter, representative methods, devices, and materials are now described.

Following long-standing patent law convention, the terms "a", "an", and "the" refer to "one or more" when used in the subject specification, including the claims. Thus, for example, reference to "a device" can include a plurality of such devices, and so forth.

Unless otherwise indicated, all numbers expressing quantities of components, conditions, and so forth used in the specification and claims are to be understood as being modified in all instances by the term "about". Accordingly, unless indicated to the contrary, the numerical parameters set forth in the instant specification and attached claims are approximations that can vary depending upon the desired properties sought to be obtained by the presently disclosed subject matter.

A tool 10 for resisting rotation of a bucket 1 of the type having a handle 2 carried on a support wire 3 is disclosed herein and throughout the drawings. The tool 10 includes a handle engaging portion 12 configured for attaching or engaging with the handle 2 of the bucket 1. The handle engaging portion 12 may be formed of metal, plastic, or any suitable material, which applies equally to the remaining components disclosed herein. A step plate 14 is coupled with the handle engaging portion 12 and configured for resting against a surface of the ground. The handle engaging portion 12 and the step engaging portion 14 are configured to extend at generally right angles from each other.

Figure 6:
FIG. 6 is an illustration of a user utilizing the tool according to one or more embodiment disclosed herein.

In operation and as illustrated in FIG. 6, the handle engaging portion 12 is engaged with the handle 2 of the bucket 1. The step plate 14 is positioned on the ground, and a user steps on the step plate 14 during mixing of materials contained within the bucket 1. The handle engaging portion 12 defines at least one arcuate recess 16 formed on outwardly extending flanges 20 that is configured for receiving an arcuate exterior surface of the handle 2 of the bucket 1. The handle 2 of the bucket is illustrated as commonly provided in the industry as a handle that is cylindrical in shaped and is received on a wire frame that is attached on opposing ends to the bucket 1.

The handle engaging portion 12 may define multiple arcuate recesses 16 that are spaced-apart to accommodate varying heights of the handle of the bucket. This is optional, but this allows variability of the tool 10 to accommodate all known commercial bucket sizes.

Figure 3:
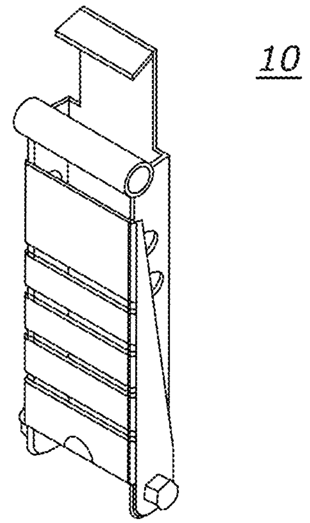
FIG. 3 is a perspective view of the tool shown in FIG. 2 where the tool is shown in a collapsed position according to one or more embodiments disclosed herein.
Figure 4:
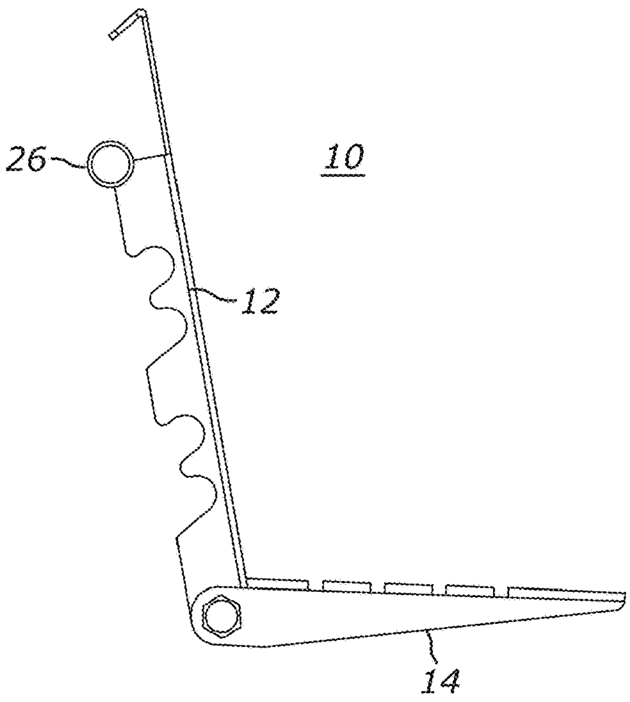
FIG. 4 is a side view of the tool shown in FIG. 2 according to one or more embodiments therein. The tool is shown in an expanded, for use position such as is illustrated in FIG. 1.
Figure 5:
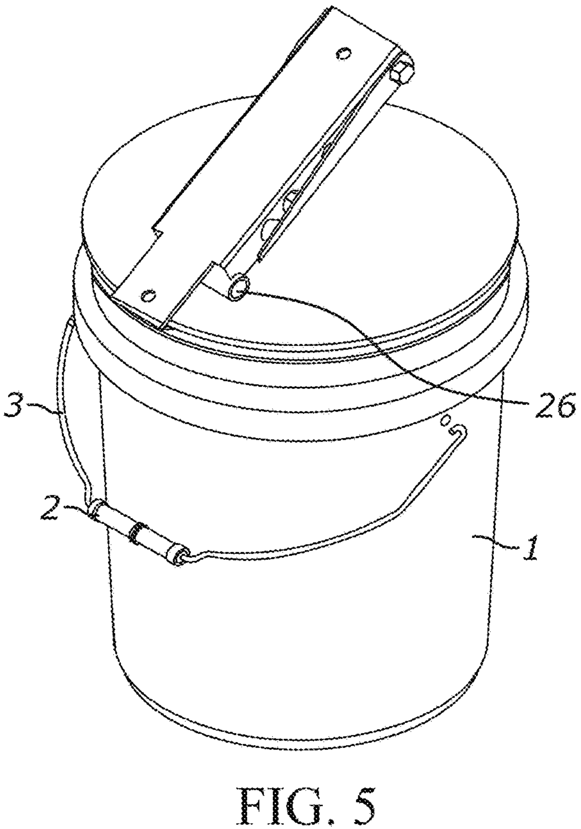
FIG. 5 is a perspective view of the tool shown in the collapsed position as illustrated in FIG. 3, where the tool is being used to assist in prying open a lid of a bucket according to one or more embodiments disclosed herein.

The handle engaging portion 12 may be hingedly connected to the step plate by a hinge assembly 22, wherein the hinge assembly 22 is a fastener assembly, although any appropriate type of hinged assembly can be used. In other embodiments, the assembly may not be hinged and is solidly and integrally formed. However, in this manner contemplated where the tool 10 defines a hinged assembly 22, the tool 10 defines a mode of operation in which the handle engaging portion 12 and the step plate 14 are rotated towards each other to create a collapsed assembly as illustrated in FIG. 3. The tool 10 is useful in the collapsed assembly for storage and/or for prying open a lid 3 of the bucket as illustrated in FIG. 5. To assist in this, the handle engaging portion 12 defines a flange 24 on a distal end thereof, the flange 24 configured for assisting in prying open a lid 3 of the bucket 1.

The tool may further include a support tube 26 on the handle engaging portion 12 for creating a fulcrum for assisting in prying open the lid 3 of the bucket 1. The handle engaging portion 12 defines apertures 30 for being received on a hook or other protrusion for use with a peg board or similar. The step plate 14 includes a plurality of recessed slots 32 for providing a gripping surface for the user's foot.

In operation, the user engages the tool 10 by recess 16 with the handle 2 of the bucket 1. The tool can be engaged in either the collapsed or expanded orientation. If in the collapsed orientation, the tool 10 is then expanded until the step plate 14 contacts the ground surface. The user then steps on the step plate 14 while using a power tool to mix the materials in the bucket 1. The recesses 16 have enough engagement with the handle 2 in order to maintain the bucket 1 in place. In the unlikely event that the step plate 14 is not being stepped on and the bucket 1 begins to spin, the tool 10 would likely break apart from the handle 2 if the tool contacted another object. This adds a further element of safety to tool 10.

Particular embodiments and features have been described with reference to the drawings. It is to be understood that these descriptions are not limited to any single embodiment or any particular set of features, and that similar embodiments and features may arise or modifications and additions may be made without departing from the scope of these descriptions and the spirit of the appended claims.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

What is claimed:

1. A tool for resisting rotation of a bucket of the type having a handle carried on a support wire, the tool comprising:

a handle engaging portion configured for attaching or engaging with the handle of the bucket, wherein the handle engaging portion defines at least one arcuate recess formed on outwardly extending flanges that is configured for receiving an arcuate exterior surface of the handle of the bucket; and a step plate coupled with the handle engaging portion and configured for resting against a surface of a ground;

wherein the handle engaging portion and the step engaging portion are configured to extend at generally right angles from each other;

whereby, in operation, the handle engaging portion is engaged with the handle of the bucket, and the step plate is positioned on the ground, and a user steps on the step plate during mixing of materials contained within the bucket.

2. The tool according to claim 1, wherein the handle engaging portion defines multiple arcuate recesses that are spaced-apart to accommodate varying heights of the handle of the bucket.

3. The tool according to claim 1, wherein the handle engaging portion is hingedly connected to the step plate by a hinge assembly, wherein the hinge assembly is a fastener assembly.

4. The tool according to claim 3, wherein the tool defines a mode of operation in which the handle engaging portion and the step plate are rotated towards each other to create a collapsed assembly, wherein, the tool is useful in the collapsed assembly for storage and/or for prying open a lid of the bucket.

5. The tool according to claim 4, wherein the handle engaging portion defines a flange on a distal end thereof, the flange configured for assisting in prying open a lid of the bucket.

6. The tool according to claim 5, further comprising a support tube on the handle engaging portion for creating a fulcrum for assisting in prying open the lid of the bucket.

7. The tool according to claim 1, wherein the handle engaging portion defines apertures for being received on a hook or other protrusion for use with a peg board.

8. The tool according to claim 1, wherein the step plate includes a plurality of recessed slots for providing a gripping surface for a user's foot.

9. A tool for resisting rotation of a bucket of the type having a handle carried on a support wire, the tool comprising:

a handle engaging portion configured for attaching or engaging with the handle of the bucket;

a support tube on the handle engaging portion for creating a fulcrum for assisting in prying open the lid of the bucket; and a step plate coupled with the handle engaging portion and configured for resting against a surface of a ground;

wherein the handle engaging portion and the step engaging portion are configured to extend at generally right angles from each other;

wherein the handle engaging portion is hingedly connected to the step plate by a hinge assembly, wherein the hinge assembly is a fastener assembly;

wherein the tool defines a mode of operation in which the handle engaging portion and the step plate are rotated towards each other to create a collapsed assembly, wherein, the tool is useful in the collapsed assembly for storage and/or for prying open a lid of the bucket;

wherein the handle engaging portion defines a flange on a distal end thereof, wherein the flange is configured for assisting in prying open a lid of the bucket;

whereby, in operation, the handle engaging portion is engaged with the handle of the bucket, and the step plate is positioned on the ground, and a user steps on the step plate during mixing of materials contained within the bucket.

10. The tool according to claim 9, wherein the handle engaging portion defines multiple arcuate recesses that are spaced-apart to accommodate varying heights of the handle of the bucket.

11. The tool according to claim 9, wherein the handle engaging portion defines apertures for being received on a hook or other protrusion for use with a peg board.

12. The tool according to claim 9, wherein the step plate includes a plurality of recessed slots for providing a gripping surface for a user's foot.

* * * * *